United States Patent
Nuissl et al.

(10) Patent No.: US 8,376,095 B2
(45) Date of Patent: Feb. 19, 2013

(54) ROLLING BEARING HAVING A BRAKING DEVICE

(75) Inventors: Christian Nuissl, Nuremberg (DE); Juergen Stoelzle, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 498 days.

(21) Appl. No.: 12/531,958

(22) PCT Filed: Feb. 19, 2008

(86) PCT No.: PCT/EP2008/052016
§ 371 (c)(1),
(2), (4) Date: Oct. 7, 2009

(87) PCT Pub. No.: WO2008/113656
PCT Pub. Date: Sep. 25, 2008

(65) Prior Publication Data
US 2010/0104234 A1    Apr. 29, 2010

(30) Foreign Application Priority Data
Mar. 20, 2007 (DE) .......................... 10 2007 013 164

(51) Int. Cl.
*B60T 13/04* (2006.01)
*F16C 33/34* (2006.01)
(52) U.S. Cl. ........................................ 188/171; 384/565
(58) Field of Classification Search ............ 188/17, 188/25, 26, 171, 158, 161; 384/548, 565, 384/572
See application file for complete search history.

(56) References Cited

U.S. PATENT DOCUMENTS

| 3,900,117 | A | * | 8/1975 | Tuovinen et al. | 414/188 |
| 5,152,614 | A | * | 10/1992 | Albert et al. | 384/43 |
| 5,232,072 | A | * | 8/1993 | Pluta | 188/72.7 |
| 2005/0282673 | A1 | * | 12/2005 | Knappe et al. | 474/198 |
| 2010/0150492 | A1 | * | 6/2010 | Nuissl et al. | 384/569 |
| 2011/0019953 | A1 | * | 1/2011 | Nuissl et al. | 384/572 |

FOREIGN PATENT DOCUMENTS

| DE | 10012773 A1 * | 8/2001 |
| DE | 101 27 487 A | 12/2002 |
| EP | 0 222 312 A | 5/1987 |
| JP | 50025408 A | 3/1975 |
| JP | 61233232 A | 10/1986 |
| JP | 03020115 | 1/1991 |
| JP | 2003 235274 A | 8/2003 |
| JP | 20055524035 A | 8/2005 |

* cited by examiner

*Primary Examiner* — Thomas J Williams
(74) *Attorney, Agent, or Firm* — Lucas & Mercanti, LLP; Klaus P. Stoffel (57) ABSTRACT

A rolling bearing which has a braking device, particularly a rotational connection, with an outer hearing race and an inner bearing race between which rolling bodies are in rolling motion on associated tracks. In order to produce a braking effect using frictional engagement, a displaceable braking element connected to one of the bearing races is pressed against a counter surface connected to the associated other bearing race and the frictional engagement may be removed with the aid of an electromagnet. The braking element is disposed as an integral bearing component inside one of the bearing races and is pressed against the counter surface by spring force, and the electromagnet encompasses one of the bearing races as the soft iron core and a coil surrounding the soft iron core.

9 Claims, 5 Drawing Sheets

ROLLING BEARING HAVING A BRAKING DEVICE

This application is a 371 of PCT/EP2008/052016 filed Feb. 19, 2008, which in turn claims the priority of DE 10 2007 013 164.1 filed Mar. 20, 2007 the priority of both applications is hereby claimed and both applications are incorporated by reference herein.

FIELD OF THE INVENTION

The invention relates to a rolling bearing having a braking device, in particular a rotational connection, comprising an outer bearing race and an inner bearing race, between which rolling bodies are in rolling motion on associated raceways, wherein in order to produce a braking effect by frictional engagement a displaceable braking element connected to one of the bearing races is pressed against an opposing face connected to the associated other bearing race and the frictional engagement may be canceled by means of an electromagnet.

BACKGROUND OF THE INVENTION

Rolling bearings having braking devices have long been known. There is a risk with rolling bearing rotational connections on wind power stations, for example, that they will fail after a relatively short time due to furrowing in the raceways. This phenomenon is produced due, in particular, to slight pivoting movements in order to compensate for the wind direction, during which the rolling bodies slide on the raceway. In order to preclude this wear, various measures are known for increasing the low rotational resistance in rolling bearings. DE 37 25 972 A1 and DE 41 04 137 A1 in this context propose to use an additionally rotating braking device. The braking force and hence the desired rotational resistance can then be externally adjusted. The disadvantage to this in the first case is that the braking element can be cancelled only when the wind power station is shut down. In the second case the braking device comprises many mechanical components making it complex to manufacture and complicated to handle.

DE 19 04 954 B discloses a pivotless rotational connection for excavators, cranes or the like for supporting a rotatable superstructure on a substructure. These rotational connections in each case comprise a one-part swivel ring and a further, two-part swivel ring assembled from two profile rings. The two swivel rings are each braced against one another by the balls of a double-row ball bearing and are equipped with a braking device. The braking devices each have one or more brake shoe carriers, which are attached to a component connected to the one-part swivel ring. A disadvantage with this arrangement is that the braking devices are located outside the actual bearing arrangement and therefore take up additional installation space.

A bearing arrangement of generic type with braking function has been previously disclosed by DE 101 27 487 A1. The radial bearing arrangement according to FIG. 1 has a deep-groove ball bearing embodied as a radial bearing and a braking device located axially next to this. The deep-groove ball bearing comprises the inner race, the outer race and bearing balls arranged in a cage between them. The deep-groove ball bearing furthermore comprises two sealing rings, which seal off the annular space from the surroundings on both sides. The braking device has an inner retaining ring and an outer retaining ring. Fixed to a radially outward-facing flange of the inner retaining ring by way of a flat wire spring is a brake disk, which is composed of a ferromagnetic material and has a brake lining on its side remote from the flange. The brake disk is rotationally locked to the inner retaining ring by way of the flat wire spring fastening and is displaceable in an axial direction. Opposite the brake lining, an opposing face, against which the brake lining is pressed during braking, is formed on the outer retaining ring. The outer retaining ring furthermore has an electrical coil and one or more permanent magnets, which are each arranged in the area between the brake disk and the deep-groove ball bearing and are mechanically connected to the outer retaining ring and consequently also to the opposing face.

A disadvantage to this is that the braking device has to be flanged in an axial direction onto the bearing as an external component and therefore takes up additional installation space. The retaining rings are of relatively complicated construction and first have to be connected in a complex manner to the bearing races with pins. A further disadvantage is that the braking effect is initiated by a permanent magnet, which attracts the brake disk. In certain applications, however, a constant magnetic field is detrimental, since iron-containing dirt is possibly attracted by the bearing.

SUMMARY OF THE INVENTION

The object of the invention, therefore, is to avoid the aforementioned disadvantages and to provide a braking device which is easy to manufacture and which takes up minimal installation space.

According to the invention this object is achieved in that the braking element is arranged as an integral bearing component inside one of the bearing races and pressed against the opposing face by, spring force, and the electromagnet comprises one of the bearing races as soft-iron core and a coil surrounding the latter.

In this way a bearing arrangement having a braking device is created, in which the braking device takes up virtually no additional installation space, since it is an integral component of the bearing. By accommodating the braking element in one of the bearing races, normally in the rotating bearing race, it is in this way possible to achieve compact rolling bearings having a braking device. A further advantage is that by arranging the braking device as an integral rolling bearing component, said device does not have to be additionally connected in a complex manner to the actual bearing arrangement. It is also advantageous that simply by using springs of different dimensions it is possible to influence the magnitude of the pre-tensioning force and hence the braking force to be applied. Use of the electromagnet also represents a straightforward way of cancelling the braking force, so that in this case the rolling bearing moves freely. Such a rolling bearing of generic type with a braking device can always be used to particular advantage, if a constant friction torque is required, but also, under certain circumstances, has to be released very rapidly. This is the case, for example, in the medical sphere, when the rolling bearing arrangement is used in a rotary joint, for example in a ceiling stand, which is connected to medical appliances of various designs. It is advantageous here that on the one hand the constant friction torque serves to prevent any unwanted turning of the rotary joint, but that on the other hand the rotary joint is easily adjustable by releasing the braking device. In an emergency, when immediate turning of both races in opposite directions is required, this must also be possible with the braking device operative. The braking force can here advantageously be set so that it is still possible to turn the two bearing races in opposite directions by physical effort.

Advantageous developments of the invention are described in the dependent claims.

According to one embodiment of the invention, the opposing face is a pressure plate, which is connected to the bearing race. In assembling the bearing unit, the pressure plate is first brought into the axial position, which corresponds to the desired air gap. The pressure plate is then fixed to the bearing race in the desired position. According to another embodiment of the invention, the connection is preferably made in that the pressure plate is of annular design and is received via a thread by an associated thread of the bearing race. These two measures represent an easy way of adjusting the air gap of the electromagnet for canceling the braking force very precisely. If the air gap is set too small, there is a risk that the braking effect will not be cancelled, since the brake lining does not lift off. If the air gap is too large, the magnetic field is weakened and the electromagnet has to be of unnecessarily large design.

According to a further embodiment, the braking element comprises a ferromagnetic armature plate, which is connected to a brake lining and held in the bearing race so that it is axially displaceable in the bearing race by multiple, circumferentially spaced locating pins, and is pre-tensioned by multiple, circumferentially spaced spring elements, and comprises the coil arranged in the bearing race, an air gap being formed between the armature plate and the bearing race in the absence of any current passing through the coil. In this way the means initiating the braking effect, that is to say the spring elements, and the means cancelling the braking effect, that is to say the coil windings, are arranged directly adjacent in the bearing race, thereby making maximum use of the installation space available.

According to an additional embodiment, the rolling bodies are formed by bearing needle rollers of two opposing axial angular contact needle-roller bearings a point of intersection of their extended axes of rotation lying in the inner bearing race or in the outer bearing race. Compared to the known rotational connections, which are preferably embodied as four-point support bearings or cross-roller bearings, the use of two axial angular contact needle-roller bearings makes manufacturing considerably more cost-effective for an equal or higher load rating. In this context it has proven advantageous that the axial angular contact needle-roller bearings are set in an O-arrangement to one another and have runners carrying the raceways. According to a further embodiment of the invention these runners can then be subjected to a hardening process. It having proven advantageous for the runners and one of the bearing races to be composed of different materials so that a further reduction in the weight of said bearing arrangement is feasible. According to yet a further embodiment of the invention, it is advantageous in this case if the bearing race without the coil is produced from a light alloy or a plastic, which receives the substantially harder runners of the axial angular contact needle-roller bearings.

According to another embodiment for adjustment of the bearing pre-tension, the bearing race is of two-part design. The race is connected to an adjusting nut displaceable in an axial direction. It has proven advantageous here according to a further embodiment, if the adjusting nut is received via a thread by a corresponding mating thread of the bearing race.

Finally, according to a final feature of the invention, the rolling bearing should lend itself to use in a ceiling stand for medical appliances. Such ceiling stands have long been known and are described, for example, in DE 36 27 517 A1, DE 43 06 803 A1 and DE 199 63 512 C1. The ceiling stand described in the last prior publication is also provided with a braking device, which comprises two brake rings, which enclose the bearing arrangement radially from the outside. Here too, the braking device is represented as an additionally produced component, which is to be arranged outside the actual bearing but which again has the disadvantages cited in the state of the art.

Further features of the invention are set forth in the following description and in the drawings, in which exemplary embodiments of the invention are represented in simplified form.

DETAILED DESCRIPTION OF THE DRAWINGS

Figure 1:
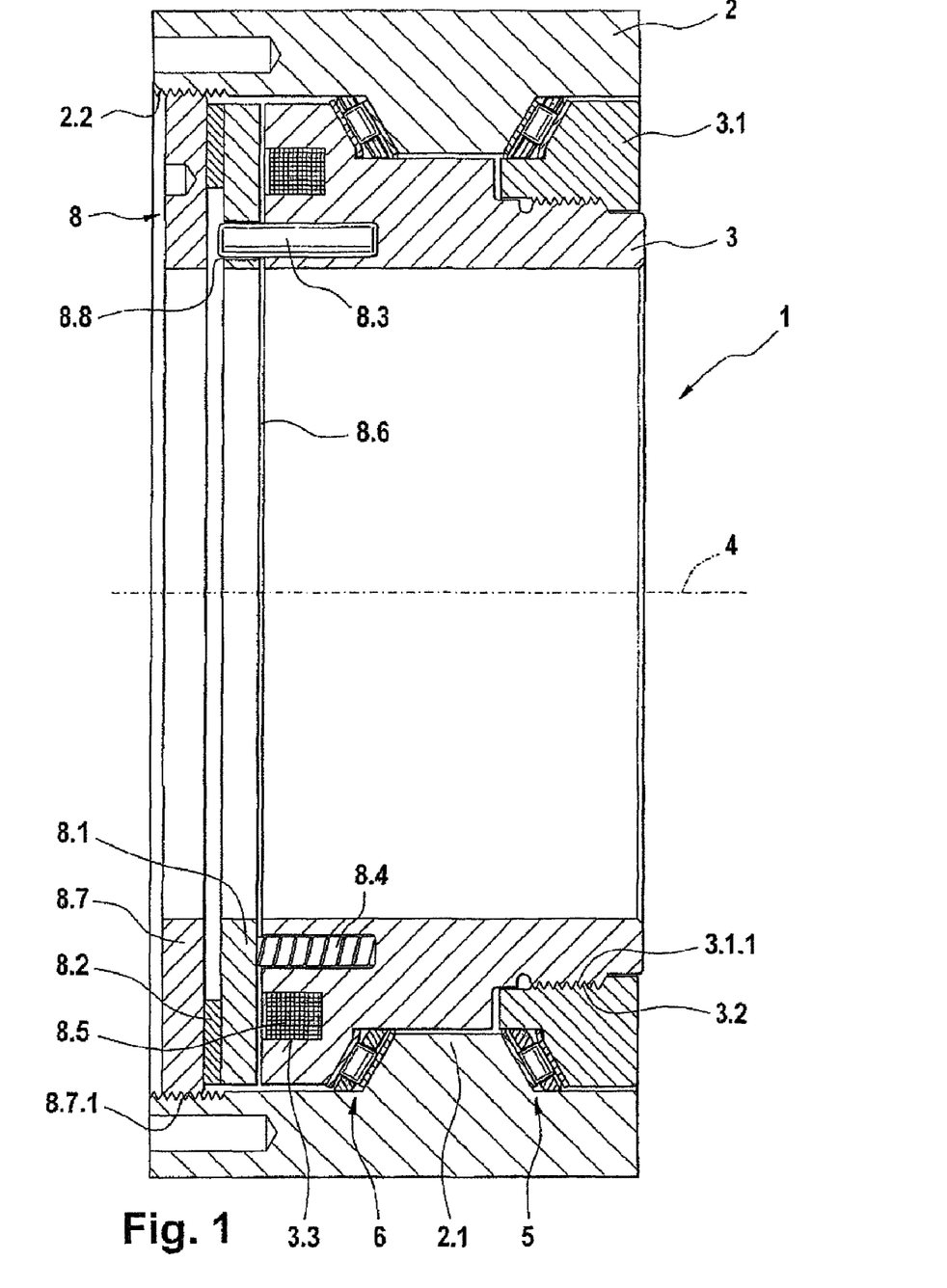
FIG. 1 shows a longitudinal section through a rolling bearing designed according to the invention along the line I-I in FIG. 2.
Figure 1A:
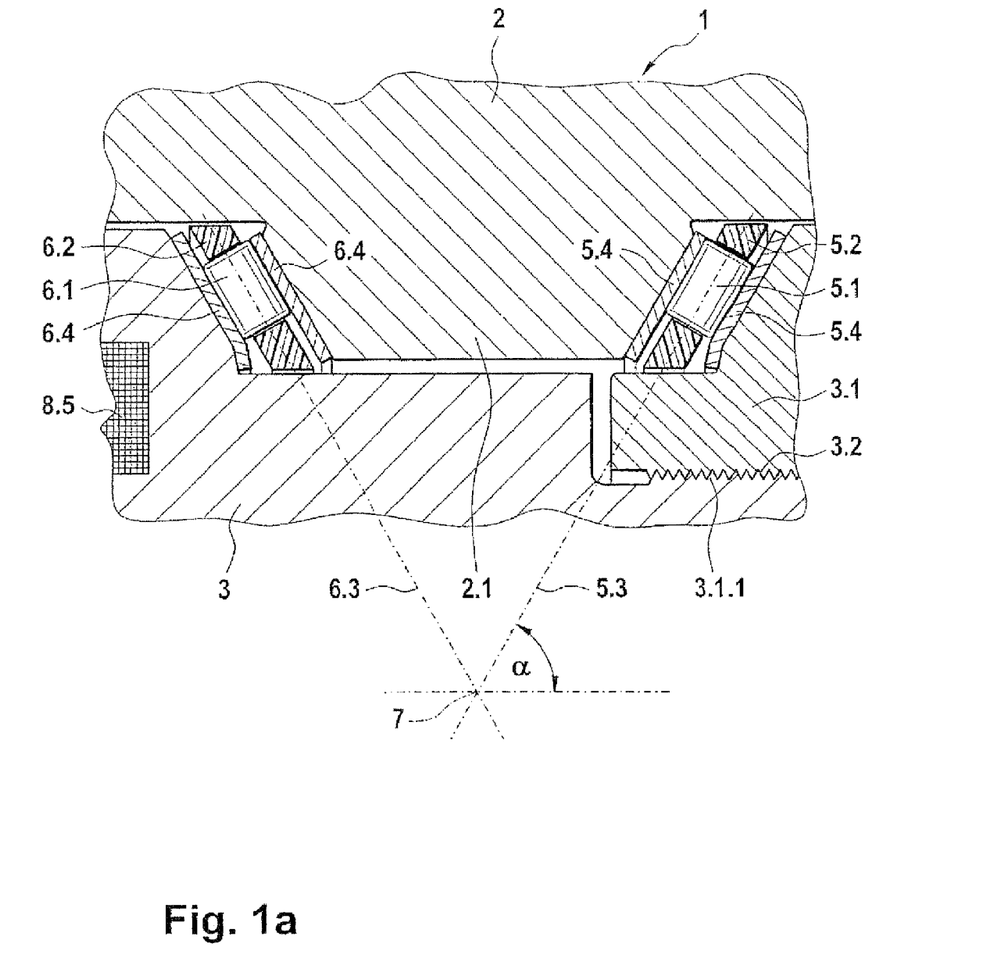
FIG. 1a shows an enlarged detail of the bearing in the area of the rolling bodies.
Figure 2:
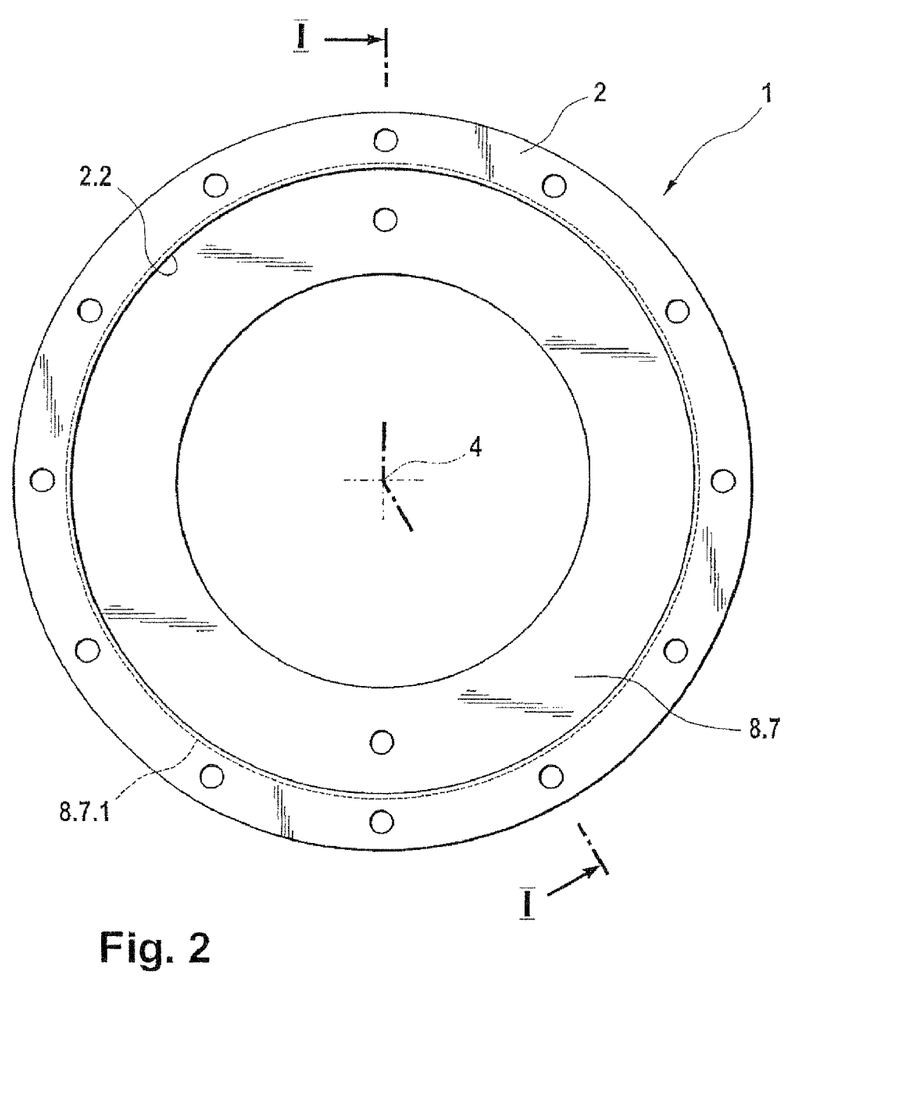
FIG. 2 shows a side view of this bearing.

The rolling bearing 1 designed according to the invention and shown in FIGS. 1, 1a and 2 comprises the outer bearing race 2 and the inner bearing race 3, which are arranged concentrically one inside the other around the bearing axis 4. Arranged in the annular space formed between them are axial angular contact needle-roller bearings 5, 6, which are set in an O-arrangement to one another. Both have rolling bodies in the form of bearing needle rollers 5.1, 6.1, which are each guided in a cage 5.2, 6.2. The extended axes of rotation 5.3, 6.3 of the bearing needle rollers 5.1, 6.2 intersecting at the point 7, which lies in the inner bearing race 3. Belonging to each of the axial angular contact needle-roller bearings 5, 6, are two runners 5.4, 6.4, which provide the raceways, not further denoted, for the bearing needle rollers 5.1, 6.1. FIG. 1a, in particular, shows that the angle of inclination α may be variable, making it possible to influence the ratio between radial and axial force absorption. As can also be seen, the inner bearing race 3 is of two-part design, the adjusting nut 3.1 being screwed by its internal thread 3.1.1 onto the external thread 3.2 of the inner bearing race 3 and thereby being displaceable in an axial direction. In this way the bearing pre-tension is easily adjustable by tightening the adjusting nut 3.1, the two axial angular contact needle-roller bearings 5, 6 being pressed against the V-shaped projection 2.1 of the outer bearing race 2.

The braking element 8 according to the invention comprises the ferromagnetic armature plate 8.1, which is of annular design and is provided on its outwardly facing external face with the brake lining 8.2. The other face of the armature plate 8.1 bears on the face of the inner bearing race 3 and is connected to the latter by locating pins 8.3. Multiple, circumferentially spaced locating pins 8.3 are here firmly positioned in the inner bearing race 3. These locating pins 8.3 engage in associated bores 8.8 in the armature plate 8.1, the bores 8.8 being somewhat larger in diameter than the diameter of the locating pins 8.3. This serves to ensure that the armature plate 8.1 is held so that it is axially displaceable in the inner bearing race 3, the plate being pre-tensioned by spring elements 8.4 uniformly spaced in a circumferential direction.

As can further be seen, the inner bearing race 3 is provided with a recess 3.3, which is open in an axial direction and in which the coil 8.5 is arranged. Also forming part of the braking element 8 is the pressure plate 8.7, which is received by its external thread 8.7.1 in the internal thread 2.2 of the outer bearing race 2. This allows the air gap 8.6 to be precisely adjusted through a different axial position of the pressure plate 8.7 in the outer bearing race 2. After adjustment of the air gap 8.6 it has proven advantageous to secure the pressure plate 8.7 against unintended displacement. In this way the inner bearing race 3 and the outer bearing race 2 are frictionally connected by way of the brake lining 8.2. This frictional engagement is defined by two parameters, namely the coefficient of friction μ of the brake lining and the pre-tensioning force F, this pre-tensioning force F being predefined by the spring elements 8.4. In the absence of any current passing through the coil 8.5, the bearing arrangement is braked, that is to say the outer bearing race 2 and the inner bearing race 3 are frictionally connected together, since the armature plate 8.1, connected to the inner bearing race 3, is pressed by the spring elements 8.4 by way of its friction lining 8.2 against the pressure plate 8.7, which in turn is connected to the outer bearing race 2. With a current passing through the coil 8.5, the generated magnetic field moves the armature plate 8.1 toward the face of the inner bearing race 3, so that the latter bears tightly and the air gap 8.6 disappears.

Figure 3:
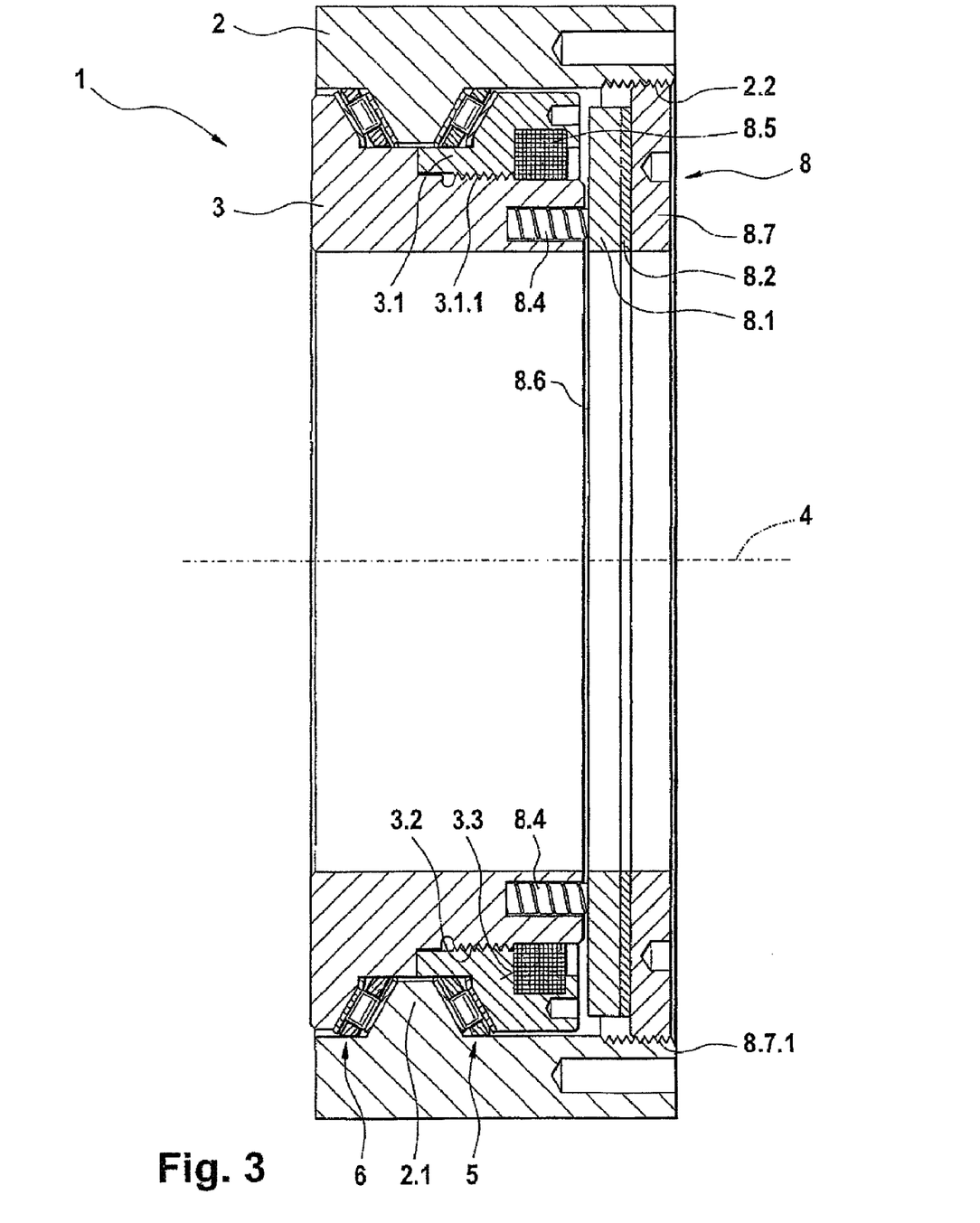
FIG. 3 shows a longitudinal section through a rolling bearing according to a second variant of the invention.

The second variant represented in FIG. 3 differs from that in FIG. 1 only in that the coil 8.5 is not arranged on the face of the inner bearing race 3 but on the face of the adjusting nut 3.1.

Figure 4:
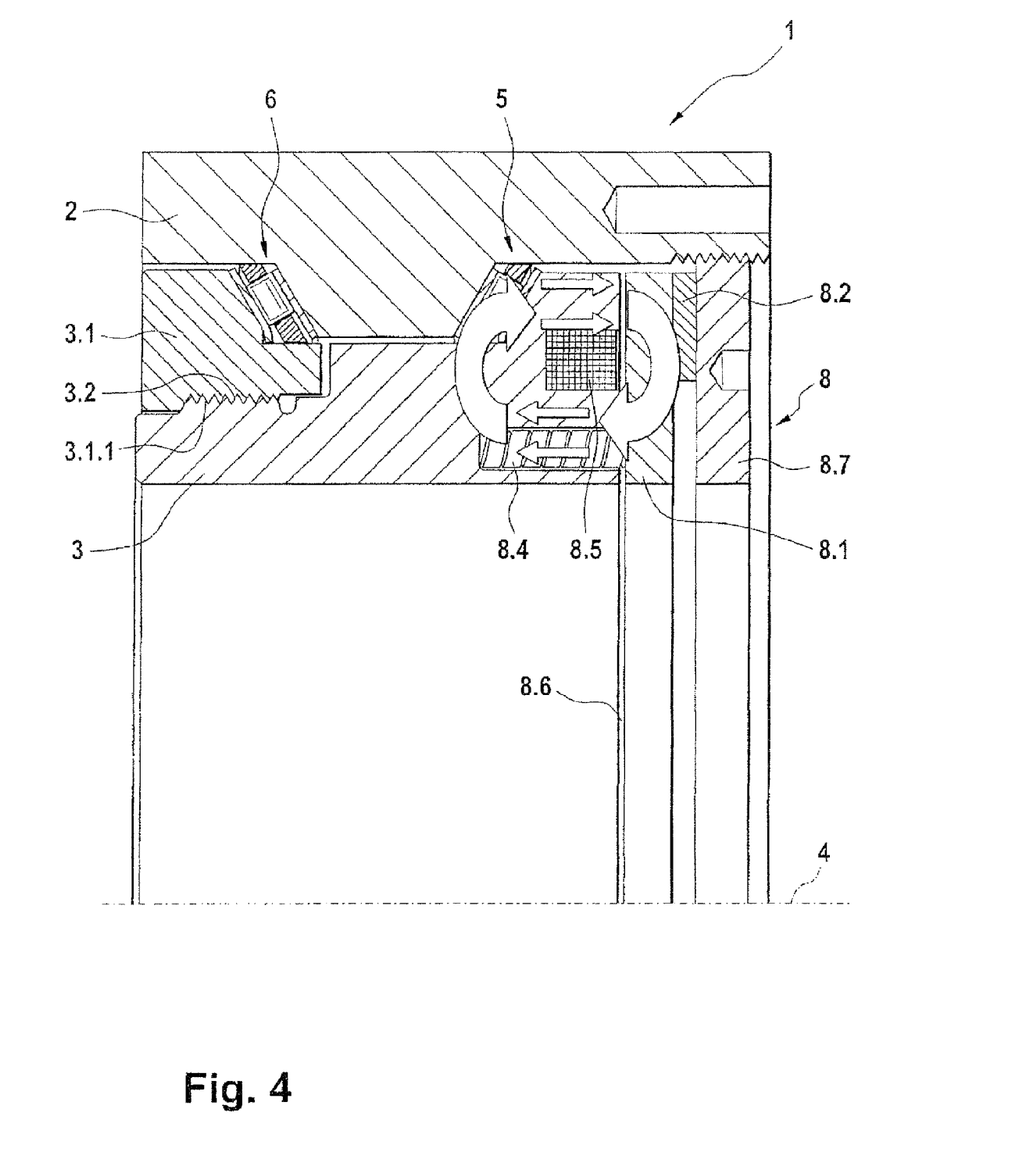
FIG. 4 shows a rolling bearing according to the invention with a representation of the magnetic flux.

FIG. 4 shows a further variant according to the invention of a rolling bearing 1 having a braking device, which will not be explained at this juncture since in principle the design construction arrived at is the same as that in the preceding figures already described. For this reason the same reference numerals have also again been used for identical parts. As also described above, the electromagnet comprises the coil 8.5, around which a magnetic field forms when a current flows through it. This magnetic field is represented by the arrows, the magnetic field being amplified by the bearing inner race 3 acting as iron core. If a current flows through the coil 8.5, the armature plate 8.1, which is composed of ferromagnetic material, is attracted by the coil 8.5, so that the present air gap 8.6, which exists between the coil 8.5 and the armature plate 8.1 in the absence of a current, is closed. Instead a gap of equal axial extent forms between the armature plate 8.1 and the brake lining 8.2, which is connected to the pressure plate 8.7. As the person skilled in the art knows, the magnetic field strength generated varies as a function of the length of the coil and its number of windings, and of the current flowing through the coil. In addition the magnetic flux density also varies as a function of the air gap 8.6, which should be as small as possible, so that this must be precisely adjustable, which is readily possible by way of the present invention.

With regard to the arrangement of the braking element 8 as an integral part of the rotating inner bearing race 3 or the adjusting nut 3.1 in the exemplary embodiments, it is again pointed out at this juncture that these are only schematic representations to illustrate the basic construction of the invention. The braking element 8 may also be an integral part of the outer bearing race 2. For each actual application the individual bearing components including the braking device are to be individually designed with respect to their configuration and choice of materials and also with respect to the formation and effect of the magnetic fields.

REFERENCE NUMERALS

1 Rolling bearing
2 Outer bearing race
2.1 Projection
2.2 Thread
3 Inner bearing race
3.1 Adjusting nut
3.1.1 Internal thread
3.2 External thread
3.3 Recess
4 Bearing axis
5 Axial angular contact needle-roller bearing
5.1 Bearing needle roller
5.2 Cage
5.3 Axis of rotation
5.4 Runner
6 Axial angular contact needle-roller bearing
6.1 Bearing needle roller
6.2 Cage
6.3 Axis of rotation
6.4 Runner
7 Point
8 Braking element
8.1 Armature plate
8.2 Brake lining
8.3 Locating pin
8.4 Spring element
8.5 Coil
8.6 Air gap
8.7 Pressure plate
8.7.1 Thread
8.8 Bore
α Angle of inclination

The invention claimed is:

1. A rolling bearing having a braking device, comprising:
an outer bearing race and an inner bearing race, one of the bearing races being provided for adjustment of pre-tension and being of a two-part design; and
rolling bodies, which roll between the outer bearing race and the inner bearing race, are formed by bearing needle rollers of two opposing axial angular contact needle-roller bearings that each have an axis of rotation, a point of intersection of axis of rotation of each of the two opposing axial angular contact needle-roller bearings lying in the inner bearing race or in the outer bearing race,
wherein, in order to produce a braking effect by frictional engagement, a displaceable braking element connected to one of the bearing races is pressed against an opposing face connected to an associated other one of the bearing races and the frictional engagement is canceled by an electromagnet, and
wherein the braking element is arranged as an integral bearing component inside one of the bearing races and pressed against the opposing face by a spring force, and the electromagnet comprises one of the bearing races as a soft-iron core and a coil surrounding the latter, and
wherein the bearing race for adjustment of pre-tension is connected to an adjusting nut that is displaceable in an axial direction.

2. The rolling bearing of claim 1, wherein the axial angular contact needle-roller bearings are set in an O-arrangement to one another and have runners carrying the raceways.

3. The rolling bearing of claim 2, wherein the runners have been subjected to a hardening process.

4. The rolling bearing of claim 2, wherein the runners and one of the bearing races are composed of different materials.

5. The rolling bearing of claim 4, wherein the bearing race without the coil is produced from a light alloy or a plastic.

6. The roiling bearing of claim 1, wherein the adjusting nut is received via a thread by a corresponding mating thread of the inner bearing race.

7. The roiling bearing of claim 1, wherein the rolling bearing is used in a ceiling mount for medical appliances.

8. A rolling bearing having a braking device, comprising:
bearing races, the bearing races being an outer bearing race and an inner bearing race, between which rolling bodies are in rolling motion on associated raceways,
wherein, in order to produce a braking effect by frictional engagement, a displaceable braking element connected to one of the bearing races is pressed against an opposing face connected to an associated other one of the bearing races and the frictional engagement is canceled by an electromagnet,
wherein the braking element is arranged as an integral bearing component inside one of the bearing races and pressed against the opposing face by a spring force, and the electromagnet comprises one of the bearing races as a soft-iron core and a coil surrounding the latter, and
wherein the opposing face is a pressure plate, which is connected to the bearing race, the pressure plate is of annular design and is received via a thread by an associated thread of the bearing race.

9. A rolling bearing having a braking device, comprising:
bearing races, the bearing races being an outer bearing race and an inner bearing race, between which rolling bodies are in rolling motion on associated raceways,
wherein, in order to produce a braking effect by frictional engagement, a displaceable braking element connected to one of the bearing races is pressed against an opposing face connected to an associated other one of the bearing races and the frictional engagement is canceled by an electromagnet,
wherein the braking element is arranged as an integral bearing component inside one of the bearing races and pressed against the opposing face by a spring force, and the electromagnet comprises one of the bearing races as a soft-iron core and a coil surrounding the latter, and
wherein the braking element comprises a ferromagnetic armature plate, which is connected to a brake lining and held in the inner bearing race so that it is axially displaceable by multiple, circumferentially spaced locating pins, and is pre-tensioned by multiple, circumferentially spaced spring elements, and comprises the coil arranged in the inner bearing race, an air gap being formed between the armature plate and the inner bearing race in an absence of any current passing through the coil.

* * * * *

UNITED STATES PATENT AND TRADEMARK OFFICE
CERTIFICATE OF CORRECTION

PATENT NO.        : 8,376,095 B2
APPLICATION NO.   : 12/531958
DATED             : February 19, 2013
INVENTOR(S)       : Nuissl et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 514 days.

Signed and Sealed this
First Day of September, 2015

Michelle K. Lee
*Director of the United States Patent and Trademark Office*